United States Patent
McKinley

(10) Patent No.: US 9,413,356 B1
(45) Date of Patent: Aug. 9, 2016

(54) CHIP OR SOC INCLUDING FUSIBLE LOGIC ARRAY AND FUNCTIONS TO PROTECT LOGIC AGAINST REVERSE ENGINEERING

(71) Applicant: Marvell International Ltd., Hamilton (BM)

(72) Inventor: Patrick A. McKinley, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/563,071

(22) Filed: Dec. 8, 2014

Related U.S. Application Data

(60) Provisional application No. 61/914,791, filed on Dec. 11, 2013.

(51) Int. Cl.
- G06F 21/00 (2013.01)
- H03K 19/177 (2006.01)
- G06K 15/00 (2006.01)
- G06F 21/75 (2013.01)
- G06F 21/14 (2013.01)

(52) U.S. Cl.
CPC .......... H03K 19/17768 (2013.01); G06F 21/14 (2013.01); G06F 21/75 (2013.01); G06K 15/4095 (2013.01); G06F 2221/2103 (2013.01)

(58) Field of Classification Search
CPC .............. G06K 15/4095; H03K 19/17768
See application file for complete search history.

(56) References Cited

U.S. PATENT DOCUMENTS

| | | | | |
|---|---|---|---|---|
| 5,225,719 A * | 7/1993 | Agrawal | .......... | H03K 19/17704 326/114 |
| 5,270,983 A * | 12/1993 | Wuertz | ..................... | G11C 7/24 326/37 |
| 5,486,776 A * | 1/1996 | Chiang | ............... | H01L 23/5252 257/50 |
| 5,487,039 A * | 1/1996 | Sukegawa | ............ | G11C 29/832 365/200 |
| 5,530,753 A * | 6/1996 | Easter | .............. | G01R 31/31719 711/E12.092 |
| 6,014,052 A * | 1/2000 | Coupe, II | .................. | G11C 7/24 327/525 |
| 7,198,348 B2 * | 4/2007 | Hu | ........................ | B41J 2/17546 347/19 |
| 7,280,772 B2 * | 10/2007 | Adkins | .............. | G03G 21/1892 399/12 |
| 7,401,223 B2 * | 7/2008 | Walmsley | ................ | G06F 21/31 380/259 |
| 7,495,970 B1 * | 2/2009 | Tang | ..................... | G11C 29/028 326/39 |
| 7,710,813 B1 * | 5/2010 | Im | ........................... | G11C 17/18 365/225.7 |
| 9,090,079 B2 * | 7/2015 | Kosugi | .................. | B41J 2/17509 |
| 2010/0157003 A1 * | 6/2010 | Edwards | .............. | B41J 2/17523 347/86 |
| 2010/0328405 A1 * | 12/2010 | Ness | ..................... | G06K 15/102 347/86 |
| 2013/0057921 A1 * | 3/2013 | Tay | ....................... | G03G 15/553 358/1.16 |

* cited by examiner

Primary Examiner — Jason M Crawford
Assistant Examiner — Kurtis R Bahr

(57) ABSTRACT

A security chip including a fusible logic array. An input is configured to receive, from a verification module external to the security chip, a seed value corresponding to one of a predetermined value and a generated value. The fusible logic array is configured to generate a logic result using the received seed value. The fusible logic array includes a logic gate configured to operate, based on a state of a fusible link within the logic gate, as both a first type of logic gate configured to perform a first logic operation and a second type of logic gate configured to perform a second logic operation different from the first logic operation. The fusible logic array is configured to generate the logic result based on the state of the fusible link. An output is configured to provide a key value, representative of the logic result, to the verification module.

19 Claims, 4 Drawing Sheets

US 9,413,356 B1

CHIP OR SOC INCLUDING FUSIBLE LOGIC ARRAY AND FUNCTIONS TO PROTECT LOGIC AGAINST REVERSE ENGINEERING

CROSS-REFERENCE TO RELATED APPLICATIONS

This application claims the benefit of U.S. Provisional Application No. 61/914,791, filed on Dec. 11, 2013.

This application is related to U.S. patent application Ser. No. 14/563,110 filed on Dec. 8, 2014. The entire disclosures of the applications referenced above are incorporated herein by reference.

FIELD

The present disclosure relates system-on-chip (SoC) security, and more particularly to systems and methods for preventing reverse engineering of SoCs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

For secure applications, systems-on-chips (SoCs) are typically designed and built to satisfy certain customer requirements. These requirements can be directed to protecting embedded information, such as encryption keys and other secret information, from being copied without authorization. The requirements can also be directed to authenticating origin and identification of a chip for use in a system, and preventing others from copying, cloning, and/or building counterfeit copies of the chip. Although the counterfeit copies can operate and appear the same as the original chip, the counterfeit copies can subvert operational intent of the original chip and/or business interests of the design and manufacturer of the original chip.

Various design techniques, system architectures, and security programs are used as counter-measures in manufacturing life cycles to protect sensitive information and to provide a check on chip authenticity. Traditionally, these were effective counter-measures to prevent competitors, clone manufacturers and/or chip counterfeiters from copying chips and/or extracting sensitive encryption keys and secret data.

The threat of having a chip copied and/or sensitive information extracted has evolved and included advanced reverse engineering techniques meant to extract key secrets or key circuit functionality from a chip based on logic-based estimates (or educated guesses). Complete physical circuit and memory data extraction from a chip has been performed to enable a counterfeit chip to be designed and produced. While an expensive undertaking, this extraction allows a counterfeit chip to be constructed having the same unique identity and secret keys as an original chip. Counterfeit copies generated using this type of extraction only succeed (i.e. operate the same and/or perform the same functions as the original chip) after replicating physically apparent attributes of the original chip and then correcting for any extraction errors.

An advanced state-of-the-art technique includes examining small portions of a chip layer-by-layer as the chip is deprocessed. Deprocessing of a chip includes stripping a chip layer-by-layer to expose visible features in each of the layers. This is done until reaching the lowest level (or substrate) of the chip. Apparent structures are synthesized in each portion of the chip to provide a netlist of connected device structures. The resulting netlist is simulated in a field-programmable gate array (FPGA). The extraction errors are iteratively resolved until the extracted circuit (i.e. circuit built as a copy of the original chip) begins to operate the same as the original chip. While time consuming, error-prone, and expensive, this technique remains a viable technique to reverse engineer a chip.

SUMMARY

A security chip includes a fusible logic array. An input is configured to receive, from a verification module external to the security chip, a seed value corresponding to one of a predetermined value and a generated value. The fusible logic array is configured to generate a logic result using the received seed value. The fusible logic array includes a logic gate configured to operate, based on a state of a fusible link within the logic gate, as both a first type of logic gate configured to perform a first logic operation and a second type of logic gate configured to perform a second logic operation different from the first logic operation. The fusible logic array is configured to generate the logic result based on the state of the fusible link. An output is configured to provide a key value, representative of the logic result, to the verification module external to the security chip.

A method of operating security chip includes receiving, from a verification module external to the security chip, a seed value corresponding to one of a predetermined value and a generated value, and generating, using a fusible logic array, a logic result using the received seed value, the fusible logic array includes a logic gate configured to operate, based on a state of a fusible link within the logic gate, as both a first type of logic gate configured to perform a first logic operation and a second type of logic gate configured to perform a second logic operation different from the first logic operation. The method further includes generating the logic result includes generating the logic result based on the state of the fusible link and providing a key value, representative of the logic result, to the verification module external to the security chip.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Traditional systems-on-chips (SoCs) may be cloned using various reverse engineering, deprocessing, and/or extraction techniques. Systems and methods according to the principles of the present disclosure prevent SoCs from being cloned and/or counterfeit chips from being manufactured.

Figure 1:
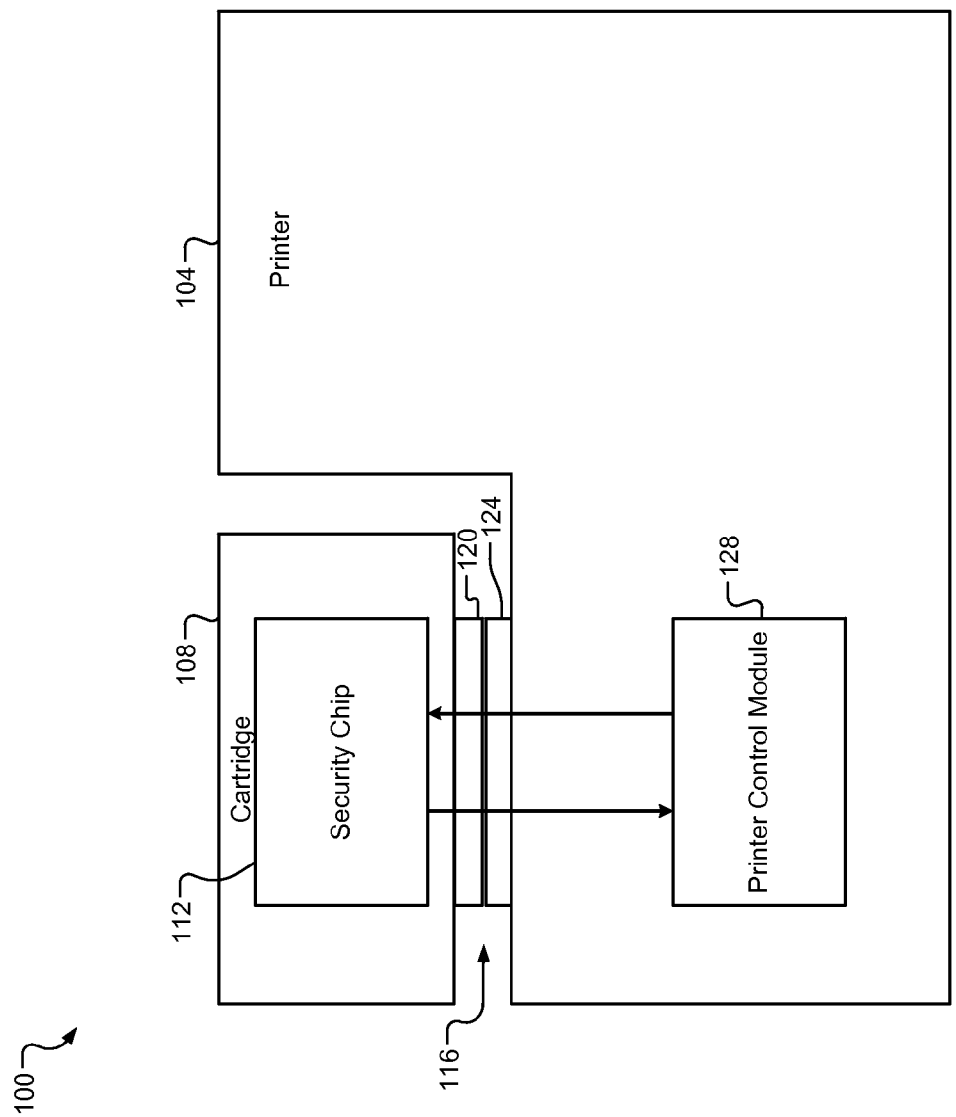
FIG. 1 is an example system configured to implement a fusible logic array and functions according to the principles of the present disclosure.

FIG. 1 shows an example system 100 configured to implement a fusible logic array and functions (FLAF) according to the principles of the present disclosure. The system 100 includes a printer 104 and a removable printer cartridge 108. The printer cartridge 108 includes a security chip 112 (e.g., an SoC) configured to implement the FLAF. However, although the system 100 is shown to include the printer 104 and the printer cartridge 108, the principles of the present disclosure can be implemented in any suitable consumer electronic device with a removable, replaceable, and/or consumable component, such as a mobile phone and a battery, charger, memory card, etc. In other words, the removable, replaceable, and/or consumable component of any consumer electronic device can be configured to implement the security chip 112 as described herein.

Further, as described herein, the security chip 112 is attached to a commodity or component (e.g., the printer cartridge 108) of a larger system (e.g., the system 100 including the printer 104) and the larger system performs the authentication challenge of the component through the attached/embedded security chip 112. However, in other embodiments, the security chip 112 may be attached/embedded into any product, and subsequently "read" by an external terminal or reader device ("a reader terminal") that acts as an authenticating authority. The reader terminal issues authentication an challenge to the security chip 112 to securely identify the security chip 112 and the product the security chip 112 is embedded/attached to. In embodiments, the reader terminal may only be used as needed or on an occasional basis (i.e., not continuously). For example only, the reader terminal may be used similar to a barcode reader at a point-of-sale, inventory control, and/or port of entry location to identify the authenticity of the product.

In embodiments, the security chip 112 could be attached/embedded to the product and used only during the process of authenticating the source and identity of the product. For example, the security chip 112 may be implemented in a luxury item that may be subject to counterfeit replacements. While a specific luxury item may be replicated, the security chip 112 could be used to authenticate the corresponding product. If the security chip 112 is missing or fails its own authenticity challenge, the authenticity of the luxury item could be questioned. The security chip 112 may not be an instrumental function of the luxury item example other than to serve as an authentication mechanism of the luxury item. As a further example, if the luxury item included branded clothing, the security chip 112 may have no value to the appeal, appearance, durability, or function of the clothing, but could be used when purchasing the clothing at a point of sale for authentication as the branded product.

Accordingly, while FIG. 1 is described with respect to the security chip 112 being located within the printer cartridge 108, in other implementations the printer 104 and/or selected components of the printer 104 may be replaced by a temporary or removable connection (e.g., a wired or wireless connection) to a reader terminal configured to interface with the security chip 112 embedded into the printer cartridge 108 or other electronic or non-electronic consumer device, a luxury item, clothing, etc.

The printer cartridge 108 is removably inserted into the printer 104 and coupled to the printer 104 via, for example only, a pressure point connector 116. For example, the pressure point connector 116 corresponds to a plug portion 120, disposed on the printer cartridge 108, that inserts into a socket portion 124 disposed on the printer 104. For example only, the plug portion 120 may include one or more plated contacts that, when inserted, electrically communicate with respective plated contacts within the socket portion 124 of the pressure point connector 116.

The printer 104 includes a printer control module 128 that communicates (e.g., over an $I^2C$ bus) with the printer cartridge 108 via the pressure point connector 116. For example, the printer cartridge 108 includes one or more ink reservoirs and dispenses ink from the ink reservoirs onto a page under control of the printer control module 128. For example only, the printer control module 128 controls the printer cartridge 108 according to a print file and corresponding print job executed by the printer 104.

The printer control module 128 further communicates with the security chip 112 to verify the authenticity of the printer cartridge 108. For example, the printer control module 128 communicates with the security chip 112 to verify that the printer cartridge 108 is an approved accessory (i.e., not a counterfeit component). Accordingly, the printer control module 128 prevents counterfeit and/or unapproved printer cartridges from being used with the printer 104.

The security chip 112 according to the principles of the present disclosure includes an FLAF circuit to implement a challenge and response verification process. For example, the printer control module 128 outputs a challenge in the form of a seed (e.g., a predetermined value, such as a string of binary data). The security chip 112 receives the seed and generates a response in the form of a key. For example only, the key corresponds to a value that is generated by inputting the seed to a logic array. The logic array is configured (e.g., programmed) to output a predetermined value in response to a given seed. The printer control module 128 compares the key to an expected key associated with the seed provided to the security chip 112. If the key received from the security chip 112 matches the expected key, the printer control module 128 verifies that the printer cartridge 108 is an approved accessory and continues operation of the printer 104. Conversely, if the key received from the security chip 112 does not match the expected key, the printer control module 128 may retransmit the seed or output a new seed, prevent further operation of the printer 104 with the printer cartridge 108, and/or take other suitable remedial actions.

For example only, the remedial actions correspond to system security policies created by a system owner, including, but not limited to, entirely disabling functions of the system, reductions of performance or quality, and/or notifying a user of the system that the commodity/component product is non-authentic, etc.

The FLAF circuit in the security chip 112 (implemented using, for example only, a 2×3 mm SoC/package) includes a programmable logic array having one or more functions that are hidden or unobservable as described below in more detail. For example only, the security chip 112 implements a plurality of fusible links between inputs (i.e., inputs for receiving the seed) and outputs (i.e., outputs for providing the key) that conceal logical functions between the input and the outputs. The fusible links may correspond to one-time electrically programmable fuses. Consequently, attempts to counterfeit the security chip 112 may be hindered because the logic performed on the inputs by the security chip 112 is more difficult to ascertain.

Figure 2:
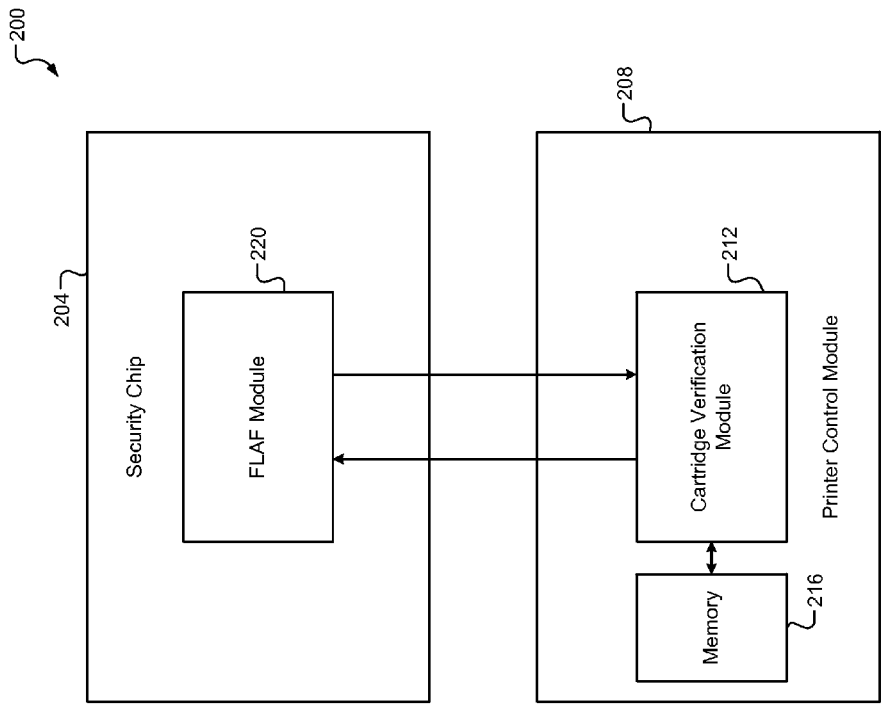
FIG. 2 is an example system including a security chip according to the principles of the present disclosure.

Referring now to FIG. 2, an example system 200 including a security chip 204 according to an embodiment is shown in more detail. A printer control module 208 communicates with the security chip 204 to verify the authenticity of the security chip 204. For example, the printer control module 208 includes a cartridge verification module 212 and memory 216. The memory 216 may store information related to verifying the security chip 204. For example, the information may include, but is not limited to, one or more predetermined seeds to be provided to the security chip 204 and corresponding expected keys to be compared to the keys received from the security chip 204.

The security chip 204 includes an example FLAF module 220 that implements an FLAF circuit according to an embodiment of the present disclosure. The FLAF module 220 is configured to provide a key to the cartridge verification module 212 in response to a seed received from the cartridge verification module 212. The FLAF module 220 includes a programmable logic array implementing a plurality of fusible links as described below in more detail.

Figure 3:
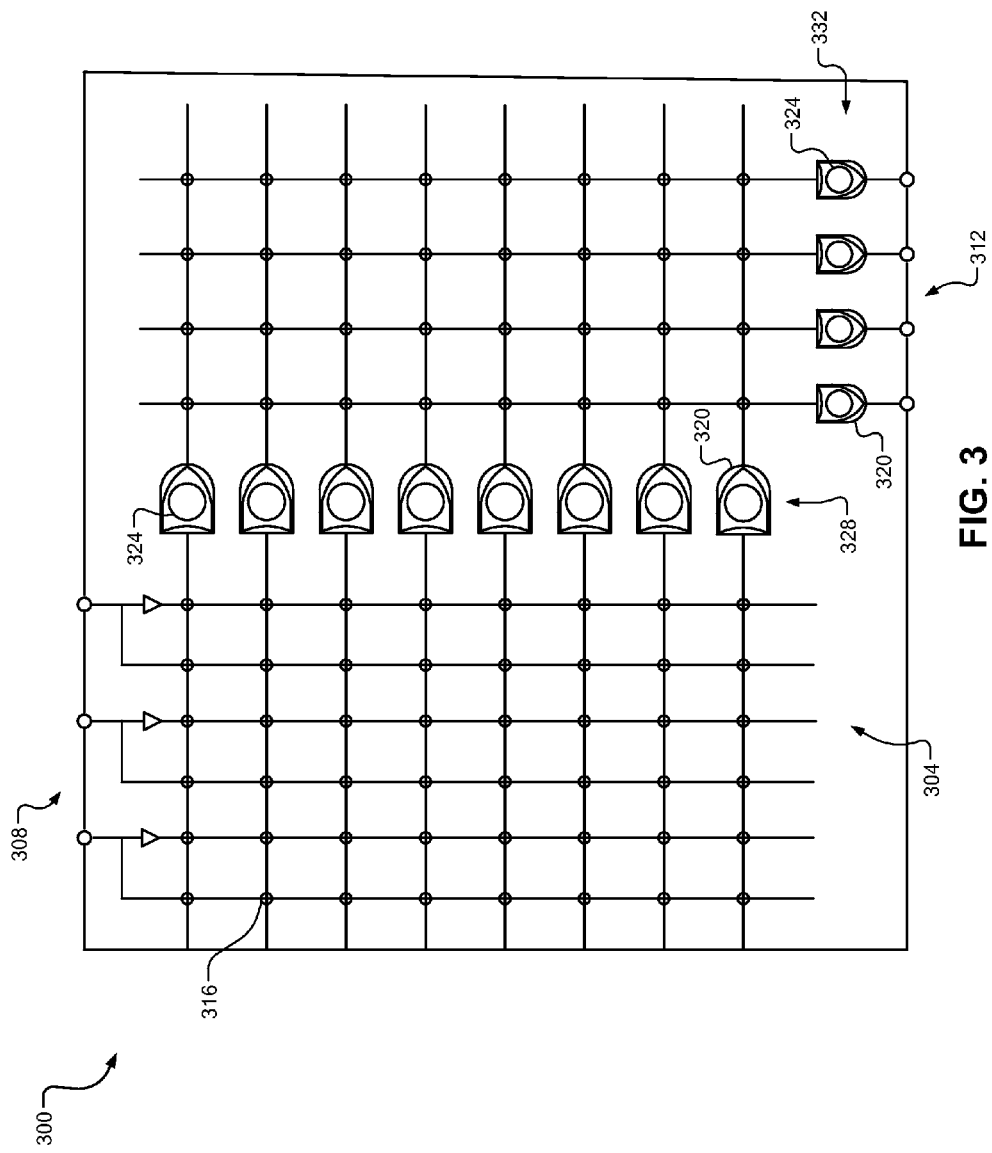
FIG. 3 is an example fusible logic array and functions circuit according to the principles of the present disclosure.

FIG. 3 shows an example FLAF module 300 implementing an FLAF circuit 304 according to an embodiment of the present disclosure. The FLAF circuit 304 corresponds to a programmable logic array including a plurality of fusible links (i.e., a fusible logic array). The circuit 304 includes one or more inputs 308 configured to receive, for example, a seed from the cartridge verification module 212 and one or more outputs 312 configured to provide a corresponding key (e.g., a logic result) in response to the received seed. The circuit 304 generates the key based on the seed and a configuration of various interconnections and logic functions of the circuit 304. In particular, the circuit 304 generates the key based on respective states of a plurality of fusible links 316. For example only, the outputs 312 correspond to a combination of a sum of products (SoP) logic equation and a product of sums (PoS) logic equation.

For example, the fusible links 316 may be provided at various intersections (e.g., intersection between metal interconnections) of the inputs 308 and/or inverted ones of the inputs 308, and at intersections of outputs of logic functions (i.e., gates) 320. Further, the logic functions 320 according to an embodiment of the present disclosure also include fusible links 324. The fusible links 316 and 324 may correspond to, for example only, one-time programmable (OTP) fusible links.

States of the fusible links 316 and 324 (e.g., fused or not fused) determine respective states of the intersections and/or logic functions 320. For example, a state of one of the fusible links 316 at an intersection indicates whether a corresponding metal interconnection is fused together. Conversely, a state of one of the fusible links 324 may indicate whether the logic function 320 corresponds to a logical AND function or a logical OR function. In other words, each logic function 320 may be configurable as each of an AND function and an OR function and the state of the corresponding fusible link 324 within the logic function 320 determines the output of the logic function.

Accordingly, the actual operation of each of the logic functions 320 is unobservable, or "hidden," as a result of the fusible link. In other words, because each logic function, when viewed, includes structure corresponding to both a logical AND function and a logical OR function, it is not readily discernible whether the actual output of the logic function will correspond to an AND operation or an OR operation. For example, an individual attempting to reverse engineer and counterfeit the security chip 204 may conclude that the outputs 308 correspond to an SoP operation when the fusible links 324 actually configure the logic functions 320 to perform a PoS operation, or vice versa.

In embodiments, operations of the logic functions 320 may be symmetrically assigned using the fusible links 324, and/or may be randomly determined or otherwise asymmetrically assigned. For example, the circuit 304 may include a first AND/OR plane 328 and a second AND/OR plane 332.

In an embodiment, each of the AND/OR planes 328 and 332 may be symmetric. For example, i) all of the logic functions 320 in the first AND/OR plane 328 and the second AND/OR plane 332 may correspond to logical AND functions, ii) all of the logic functions 320 in the first AND/OR plane 328 and the second AND/OR plane 332 may correspond to logical OR functions, iii) all of the logic functions 320 in the first AND/OR plane 328 may correspond to logical AND functions while all of the logic functions 320 in the second AND/OR plane 332 may correspond to logical OR functions, or iv) all of the logic functions 320 in the first AND/OR plane 328 may correspond to logical OR functions while all of the logic functions 320 in the second AND/OR plane 332 may correspond to logical AND functions.

In another embodiment, the one or both of the AND/OR planes 328 and 332 may be randomly assigned or otherwise asymmetric. For example, i) the logic functions 320 of the first AND/OR plane 328 may include both logical AND functions and logical OR functions while the logic functions 320 of the second AND/OR plane 332 include only logical AND functions or logical OR functions, ii) the logic functions 320 of the second AND/OR plane 332 may include both logical AND functions and logical OR functions while the logic functions 320 of the first AND/OR plane 328 include only logical AND functions or logical OR functions, or iii) the logic functions 320 of each of the first AND/OR plane 328 and the second AND/OR plane 328 include both logical AND functions and logical OR functions.

Accordingly, even if an individual is able to determine or assume an actual operation of one of the logic functions 320 (despite the difficulty caused by the fusible links 324), an accurate determination of the overall operation of the circuit 304 is still unlikely.

Figure 4:
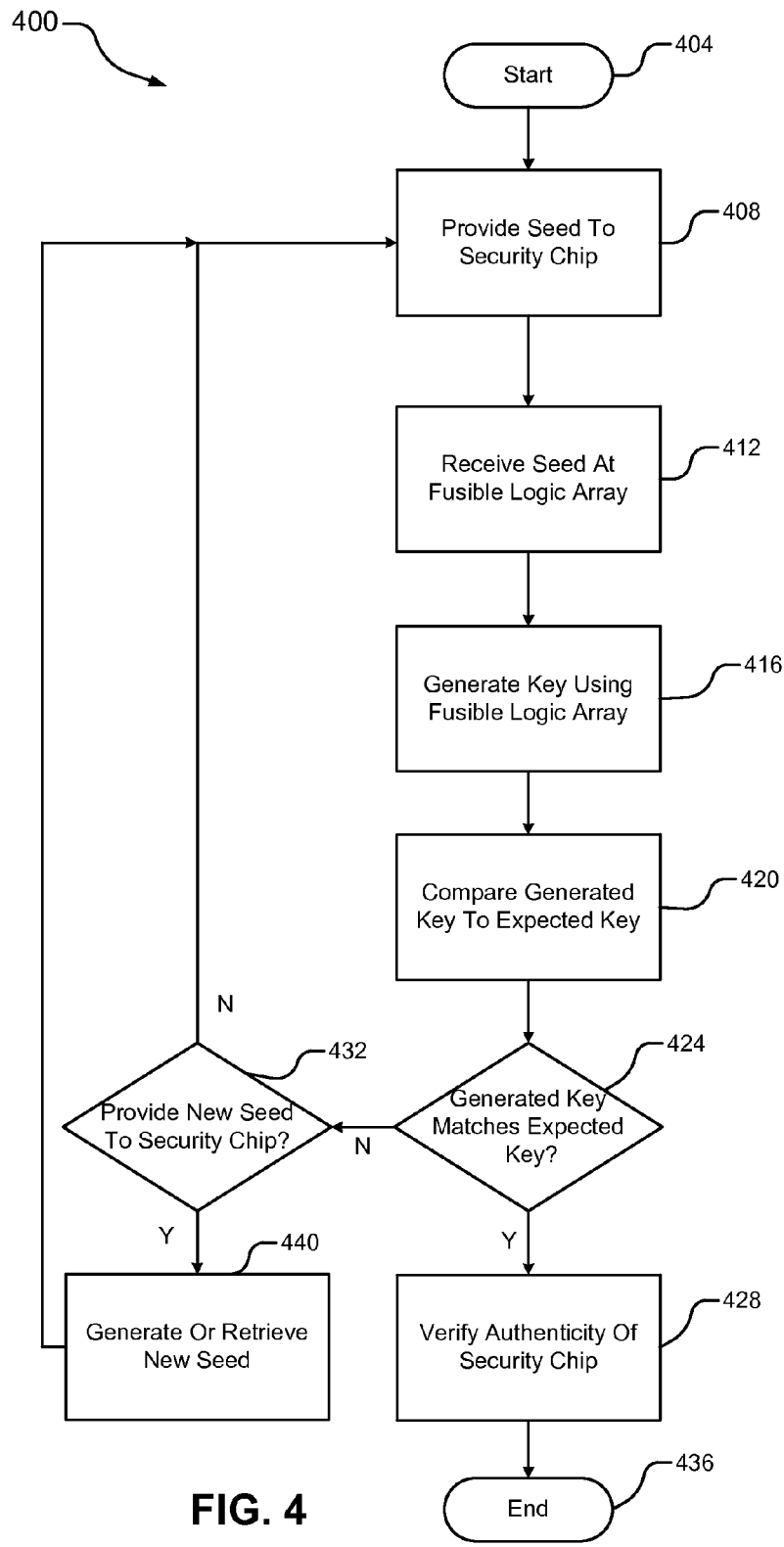
FIG. 4 is an example method for verifying a security chip having a fusible logic array and functions circuit according to the principles of the present disclosure.

FIG. 4 shows an example method 400, beginning at 404, for verifying a security chip having a fusible logic array according to the principles of the present disclosure. At 408, the method 400 provides a seed to the security chip. For example, a verification module, circuit, or other component of a consumer electronic device may generate the seed, retrieve a predetermined seed from memory, etc., and output the seed. At 412, the method 400 receives the seed at the fusible logic array. At 416, the method 400 generates a key based on the received seed and a configuration of the fusible logic array. For example, the method 400 generates the key based on respective states of a plurality of fusible links of the fusible logic array. At 420, the method 400 compares the key to an expected key corresponding to the seed. For example, the expected key may be retrieved from the memory for the comparison. At 424, the method 400 determines whether the key matches the expected key. If true, the method 400 continues to 428. If false, the method 400 continues to 432. At 428, the method 400 verifies that the security chip is authentic and ends at 436.

At 432, the method 400 determines whether to provide a new seed to the security chip. If true, the method 400 continues to 440. If false, the method 400 continues to 408. At 440, the method 400 generates or retrieves a new seed and continues to 408.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Smalltalk, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A security chip, comprising:
    an input configured to receive, from a verification module external to the security chip, a seed value, wherein the seed value corresponds to one of a predetermined value and a generated value;
    a fusible logic array configured to generate a logic result using the received seed value, wherein
        the fusible logic array includes a logic gate having structure corresponding to both i) a first type of logic gate configured to perform a first logic operation and ii) a second type of logic gate configured to perform a second logic operation different from the first logic operation,
        the logic gate includes a fusible link located within the logic gate, wherein the logic gate is configured to operate, based on a state of the fusible link, as both the first type of logic gate and the second type of logic gate, and wherein the fusible link is arranged to conceal which of the first type of logic gate and the second type of logic gate the logic gate is configured as, and
        the fusible logic array is configured to generate the logic result based on the state of the fusible link; and
    an output configured to provide a key value, representative of the logic result, to the verification module external to the security chip.

2. The security chip of claim 1, wherein the security chip corresponds to a system-on-chip.

3. The security chip of claim 1, wherein fusible logic array includes a plurality of the logic gates, each of the logic gates including a respective fusible link of a plurality of the fusible links.

4. The security chip of claim 3, wherein i) a first logic gate of the plurality of logic gates is configured, using the respective fusible link of the first logic gate, to perform the first logic operation and ii) a second logic gate of the plurality of logic gates is configured, using the respective fusible link of the second logic gate, to perform the second logic operation.

5. The security chip of claim 3, wherein the plurality of logic gates includes i) a first plurality of logic gates each configured, using the respective fusible links of the first plurality of logic gates, to perform the first logic operation and ii) a second plurality of logic gates each configured, using the respective fusible links of the second plurality of logic gates, to perform the second logic operation.

6. The security chip of claim 1, wherein i) the first logic operation corresponds to a logical AND operation and ii) the second logic operation corresponds to a logical OR operation.

7. The security chip of claim 1, wherein the fusible link includes a one-time programmable fuse.

8. A printer cartridge including the security chip of claim 1.

9. A system including the security chip of claim 1, the system further comprising:
   a printer cartridge, wherein the security chip is located on or within the printer cartridge; and
   a printer, wherein the verification module is located within the printer.

10. A system including the security chip of claim 1 and further comprising:
    the verification module; and
    memory configured to store i) the seed value and ii) an expected key value corresponding to the seed value,
    wherein the verification module is configured to i) receive the key value from the security chip, ii) compare the key value received from the security chip to the expected key value, and iii) selectively verify whether the security chip is authentic based on the comparison.

11. A method of operating security chip, the method comprising:
    receiving, from a verification module external to the security chip, a seed value, wherein the seed value corresponds to one of a predetermined value and a generated value;
    generating, using a fusible logic array, a logic result using the received seed value, wherein
       the fusible logic array includes a logic gate having structure corresponding to both i) a first type of logic gate configured to perform a first logic operation and ii) a second type of logic gate configured to perform a second logic operation different from the first logic operation, and
       the logic gate includes a fusible link located within the logic gate, wherein the logic gate is configured to operate, based on a state of the fusible link, as both the first type of logic gate and the second type of logic gate, and wherein the fusible link is arranged to conceal which of the first type of logic gate and the second type of logic gate the logic gate is configured as, and
       generating the logic result includes generating the logic result based on the state of the fusible link; and
    providing a key value, representative of the logic result, to the verification module external to the security chip.

12. The method of claim 11, wherein the security chip corresponds to a system-on-chip.

13. The method of claim 11, wherein fusible logic array includes a plurality of the logic gates, each of the logic gates including a respective fusible link of a plurality of the fusible links.

14. The method of claim 13, further comprising:
    configuring a first logic gate of the plurality of logic gates, using the respective fusible link of the first logic gate, to perform the first logic operation; and
    configuring a second logic gate of the plurality of logic gates, using the respective fusible link of the second logic gate, to perform the second logic operation.

15. The method of claim 13, further comprising:
    configuring a first plurality of logic gates, using the respective fusible links of the first plurality of logic gates, to perform the first logic operation; and
    configuring a second plurality of logic gates, using the respective fusible links of the second plurality of logic gates, to perform the second logic operation.

16. The method of claim 11, wherein i) the first logic operation corresponds to a logical AND operation and ii) the second logic operation corresponds to a logical OR operation.

17. The method of claim 11, wherein the fusible link includes a one-time programmable fuse.

18. The method of claim 11, wherein the security chip is located in a printer cartridge.

19. The method of claim 11, further comprising:
    storing i) the seed value and ii) an expected key value corresponding to the seed value;
    receiving the key value from the security chip;
    comparing the key value received from the security chip to the expected key value; and
    selectively verifying whether the security chip is authentic based on the comparison.

* * * * *